United States Patent
Nakaishi

(10) Patent No.: US 10,720,654 B2
(45) Date of Patent: Jul. 21, 2020

(54) SEALING MEMBER WITH BIFURCATED ANNULAR LEG PORTIONS AND BATTERY USING THE SAME

(71) Applicant: Sumitomo Electric Industries, Ltd., Osaka-shi (JP)

(72) Inventor: Hiroyuki Nakaishi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 110 days.

(21) Appl. No.: 16/073,060

(22) PCT Filed: Jan. 11, 2017

(86) PCT No.: PCT/JP2017/000643
§ 371 (c)(1),
(2) Date: Jul. 26, 2018

(87) PCT Pub. No.: WO2017/130697
PCT Pub. Date: Aug. 3, 2017

(65) Prior Publication Data
US 2019/0237776 A1    Aug. 1, 2019

(30) Foreign Application Priority Data
Jan. 26, 2016   (JP) ................. 2016-012836

(51) Int. Cl.
*H01M 8/0273*   (2016.01)
*H01M 8/02*   (2016.01)
(Continued)

(52) U.S. Cl.
CPC ........... *H01M 8/0273* (2013.01); *H01M 8/02* (2013.01); *H01M 8/0271* (2013.01);
(Continued)

(58) Field of Classification Search
CPC .... H01M 8/0273; H01M 8/2483; H01M 8/02; H01M 8/0271; H01M 8/0284; H01M 8/18; H01M 8/188
(Continued)

(56) References Cited

U.S. PATENT DOCUMENTS 4,589,968 A * 5/1986 Toomey, Jr. .............. C25B 9/20
204/257
9,172,069 B2  10/2015 Nakaishi et al.
(Continued)

FOREIGN PATENT DOCUMENTS

JP    2001-155758 A    6/2001
JP    2002-367660 A    12/2002
(Continued)

*Primary Examiner* — Sean P Cullen
(74) *Attorney, Agent, or Firm* — Baker Botts L.L.P.; Michael A. Sartori

(57) ABSTRACT

A battery is provided which includes at least one pair of cell frames stacked together and each including a frame body and a bipolar plate, the frame body having a manifold serving as a flow path for a battery fluid, the bipolar plate being disposed inside the frame body; a positive electrode and a negative electrode; and a membrane having a through hole corresponding to the manifold. The battery includes a sealing member including an annular base portion and bifurcated annular leg portions. The annular base portion is disposed along an inner periphery of the through hole, and the bifurcated annular leg portions extend from the annular base portion toward the outside of the through hole in such a manner that the membrane is sandwiched therebetween. The sealing member is interposed between the frame bodies stacked together.

9 Claims, 5 Drawing Sheets

(51) Int. Cl.
*H01M 8/0271* (2016.01)
*H01M 8/18* (2006.01)
*H01M 8/2483* (2016.01)
*H01M 8/0284* (2016.01)

(52) U.S. Cl.
CPC ........... *H01M 8/0284* (2013.01); *H01M 8/18* (2013.01); *H01M 8/188* (2013.01); *H01M 8/2483* (2016.02); *Y02E 60/528* (2013.01)

(58) Field of Classification Search
USPC ....................................................... 429/469
See application file for complete search history.

(56) References Cited

U.S. PATENT DOCUMENTS

| | | |
|---|---|---|
| 2007/0264557 A1 | 11/2007 | Kobayashi et al. |
| 2010/0104941 A1* | 4/2010 | Nakabayashi ........... H01G 9/10 |
| | | 429/181 |
| 2013/0307227 A1 | 11/2013 | Ueda et al. |
| 2013/0309540 A1 | 11/2013 | Nakaishi et al. |

FOREIGN PATENT DOCUMENTS

| | | | |
|---|---|---|---|
| JP | 2007323882 A | * | 12/2007 |
| JP | 2009048963 A | * | 3/2009 |
| JP | 2012-216510 A | | 11/2012 |
| KR | 20060112744 A | * | 11/2006 |

* cited by examiner

SEALING MEMBER WITH BIFURCATED ANNULAR LEG PORTIONS AND BATTERY USING THE SAME

TECHNICAL FIELD

The present invention relates to a fluid flow battery, such as a fuel cell or redox flow battery, and also relates to a sealing member used in the fluid flow battery.

BACKGROUND ART

Typical examples of the fluid flow battery include a redox flow battery (which may hereinafter be referred to as an RF battery). The RF battery performs charge and discharge by supplying a positive electrode electrolyte and a negative electrode electrolyte to a cell that includes a membrane and positive and negative electrodes that are disposed opposite each other, with the membrane interposed therebetween.

A water solution that contains metal ions (active materials) whose valence is changed by oxidation-reduction is typically used as an electrolyte. FIG. 4 illustrates a working principle of a vanadium-based RF battery 100 using a vanadium electrolyte that contains vanadium (V) ions as active materials for a positive electrode electrolyte and a negative electrode electrolyte.

The RF battery 100 includes a battery cell 100C divided into a positive electrode cell 102 and a negative electrode cell 103 by a membrane 101 that allows hydrogen ions to pass therethrough. The positive electrode cell 102 includes a positive electrode 104 therein, and a positive electrode electrolyte tank 106 configured to store the positive electrode electrolyte therein is connected to the positive electrode cell 102 through pipes 108 and 110. Similarly, the negative electrode cell 103 includes a negative electrode 105 therein, and a negative electrode electrolyte tank 107 configured to store the negative electrode electrolyte therein is connected to the negative electrode cell 103 through pipes 109 and 111. During charge and discharge, the electrolytes stored in the tanks 106 and 107 are circulated in the cells 102 and 103 by pumps 112 and 113. In FIG. 4, solid arrows in the battery cell 100C indicate a charge reaction and broken arrows in the battery cell 100C indicate a discharge reaction.

The battery cell 100C is normally stacked with other ones and used in the form of a structure called a cell stack 200, as illustrated in the lower part of FIG. 5. The cell stack 200 has a multilayer structure formed by stacking a plurality of battery cells 100C each including, as illustrated in the upper part of FIG. 5, the positive electrode 104, the membrane 101, and the negative electrode 105 that are stacked and sandwiched between cell frames 120. The electrodes 104 and 105 at both ends of the cell stack 200 in the stacking direction of the battery cells 100C are provided with respective current collector plates (not shown), instead of the cell frames 120. End plates 201 are disposed at both ends of the cell stack 200 in the stacking direction of the battery cells 100C. The end plates 201 in a pair are coupled together by coupling members 202, such as long bolts, therebetween and combined into a single structure.

The cell frames 120 each include a bipolar plate 121 made of plastic carbon (e.g., resin containing graphite) and a frame body 122 made of plastic and formed along the outer periphery of the bipolar plate 121. The frame body 122 is provided with liquid supply manifolds 131 and 132 and liquid supply slits 131s and 132s for supplying an electrolyte to each battery cell 100C, and liquid discharge manifolds 133 and 134 and liquid discharge slits 133s and 134s for discharging the electrolyte. The positive electrode electrolyte is supplied from the liquid supply manifold 131 through the liquid supply slit 131s formed on one side of the frame body 122 (i.e., on the front side of the drawing) to the positive electrode 104, and then discharged through the liquid discharge slit 133s to the liquid discharge manifold 133. Similarly, the negative electrode electrolyte is supplied from the liquid supply manifold 132 through the liquid supply slit 132s formed on the other side of the frame body 122 (i.e., on the back side of the drawing) to the negative electrode 105, and then discharged through the liquid discharge slit 134s to the liquid discharge manifold 134.

The cell stack 200 is formed by sequentially and repeatedly stacking one cell frame 120, the positive electrode 104, the membrane 101, the negative electrode 105, another cell frame 120, and so on. This allows the manifolds 131 to 134 to form an electrolyte flow path in the stacking direction of the battery cells 100C in the cell stack 200. The membrane 101 has substantially the same area as the cell frames 120 and is provided with through holes 101h at portions facing the respective manifolds 131 to 134 formed in the frame body 122 of each cell frame 120 (see PTLs 1 and 2). To prevent the electrolyte from leaking between the positive electrode cell 102 and the negative electrode cell 103 through the through holes 101h and also prevent the electrolyte from leaking through the through holes 101h to the outside of the cell stack 200, the through holes 101h in the membrane 101 are each generally provided with an O-ring (not shown) therearound.

CITATION LIST

Patent Literature

PTL 1: Japanese Unexamined Patent Application Publication No. 2001-155758
PTL 2: Japanese Unexamined Patent Application Publication No. 2002-367660

SUMMARY OF INVENTION

Technical Problem

For sealing against the electrolyte passing through a through hole in the membrane, an O-ring is provided on either one or both of the front and back surfaces of the membrane. If only one of the front and back surfaces of the membrane has an O-ring thereon, sealing on the other side having no O-ring thereon may be insufficient. Also, if only one of the front and back surfaces of the membrane has an O-ring thereon, the membrane may be broken because pressure from the O-ring is applied to only one side of the membrane. However, for providing an O-ring on each of the front and back surfaces of the membrane, it is necessary not only to prepare two O-rings, but also to perform positioning in such a manner that the O-rings on the front and back surfaces of the membrane face each other. This positioning of the O-rings is complex because if the O-rings on the front and back surfaces of the membrane are displaced from each other, pressures from the O-rings are applied to different areas of the front and back surfaces and this may cause breakage of the membrane. Therefore, sealing against electrolyte passing through a through hole in the membrane needs to be achieved reliably with a small number of components.

The present invention has been made in view of the circumstances described above. An object of the present invention is to provide a battery that can easily ensure sealing against a battery fluid and is easy to assemble. Another object of the present invention is to provide a sealing member that can easily ensure sealing against the battery fluid.

Solution to Problem

A battery according to an aspect of the present invention includes at least one pair of cell frames stacked together and each including a frame body and a bipolar plate, the frame body having a manifold serving as a flow path for a battery fluid, the bipolar plate being disposed inside the frame body; a positive electrode and a negative electrode disposed opposite each other between the bipolar plates of the pair of cell frames; and a membrane interposed between the frame bodies stacked together and between the electrodes, the membrane having a through hole corresponding to the manifold. The battery includes a sealing member including an annular base portion disposed along an inner periphery of the through hole and bifurcated annular leg portions extending from the annular base portion toward the outside of the through hole in such a manner that the membrane is sandwiched therebetween, the sealing member being interposed between the frame bodies stacked together.

A sealing member according to another aspect of the present invention is a sealing member by which a cell member having a through hole that allows a battery fluid to pass therethrough is sealed against the battery fluid. The sealing member includes an annular base portion disposed along an inner periphery of the through hole, and bifurcated annular leg portions extending from the annular base portion toward the outside of the through hole in such a manner that the cell member is sandwiched therebetween.

Advantageous Effects of Invention

The battery described above can easily ensure sealing against the battery fluid and is easy to assemble. The sealing member described above can easily ensure sealing against the battery fluid.

DESCRIPTION OF EMBODIMENTS

Figure 1:
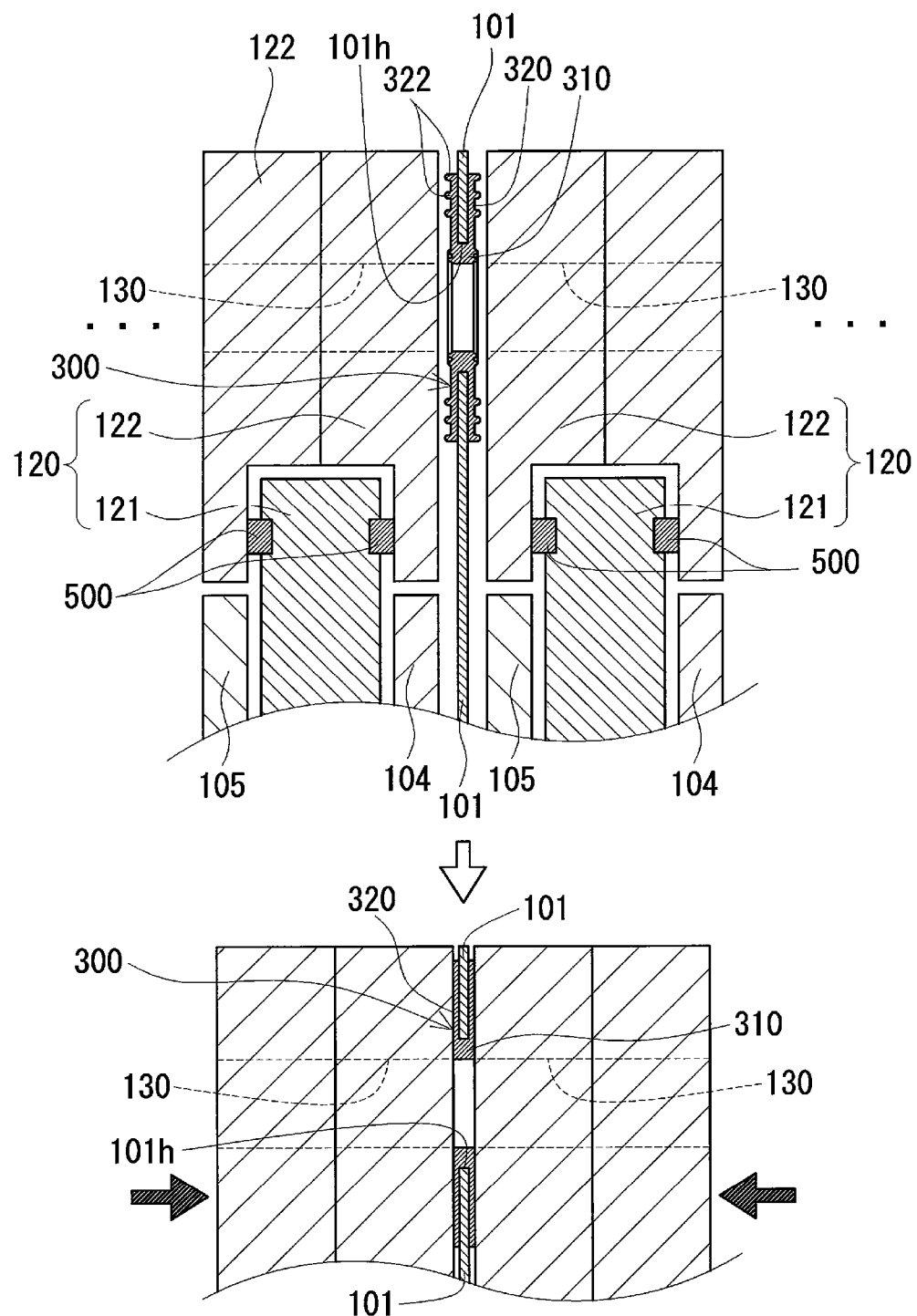
FIG. 1 is a partial enlarged schematic cross-sectional view for explaining a battery cell included in a redox flow battery according to a first embodiment.

Description of Embodiments of the Present Invention

First, embodiments of the present invention will be listed.

(1) A battery according to an embodiment of the present invention includes at least one pair of cell frames stacked together and each including a frame body and a bipolar plate, the frame body having a manifold serving as a flow path for a battery fluid, the bipolar plate being disposed inside the frame body; a positive electrode and a negative electrode disposed opposite each other between the bipolar plates of the pair of cell frames; and a membrane interposed between the frame bodies stacked together and between the electrodes, the membrane having a through hole corresponding to the manifold. The battery includes a sealing member including an annular base portion and bifurcated annular leg portions. The annular base portion is disposed along an inner periphery of the through hole, and the bifurcated annular leg portions extend from the annular base portion toward the outside of the through hole in such a manner that the membrane is sandwiched therebetween. The sealing member is interposed between the frame bodies stacked together.

With the configuration described above, the bifurcated annular leg portions can provide sealing between each of the front and back surfaces of the membrane and a corresponding one of the frame bodies stacked together. Specifically, of the bifurcated annular leg portions, one annular leg portion provides sealing between one side of the membrane and one frame body, and the other annular leg portion provides sealing between the other side of the membrane and the other frame body. Also, the annular base portion can provide sealing against passage from one side (front surface) of the membrane through the through hole to the other side (back surface) of the membrane. Since the bifurcated annular leg portions and the annular base portion are formed as an integral member, the sealing at three different points (i.e., sealing between one side of the membrane and one frame body, sealing between the other side of the membrane and the other frame body, and sealing against passage from one side to the other side of the membrane) can be provided by a single sealing member. With the configuration described above, the entire inner periphery of the through hole in the membrane is sealed. This can provide electrical insulation between the interior and exterior of the manifold and between the positive and negative electrode electrolytes.

As described, the sealing member includes the annular base portion disposed along the inner periphery of the through hole in the membrane, and the bifurcated annular leg portions extending from the annular base portion toward the outside of the through hole. Thus, by simply positioning the annular base portion of the sealing member along the inner periphery of the through hole and sandwiching the membrane between the bifurcated annular leg portions, the sealing member can be easily attached to the membrane. Also, throughout the circumference of the through hole in the membrane, the sealing member is disposed to extend outward from the inner periphery of the through hole. The sealing member can thus be reliably attached to the membrane without being displaced from, or falling off, the membrane. Therefore, as compared to the case of placing an O-ring on each of the front and back surfaces of the membrane, the bifurcated annular leg portions are less likely to be displaced from each other, the membrane is less likely to be broken or damaged, and battery assembly is done more easily.

(2) In an example of the battery, the annular leg portions may each have a ridge on a surface thereof facing a corresponding one of the frame bodies.

The annular leg portions are each disposed between, and pressed into contact with, the membrane and the corresponding one of the frame bodies. Therefore, when the annular leg portion has a ridge on the surface thereof adjacent to the corresponding frame body, the ridge is compressed and deformed by the pressure contact. Thus, the resulting surface pressure at the contact with the frame body can provide improved sealing.

(3) In another example of the battery, a surface of each of the annular leg portions, the surface facing the membrane, may be flat.

The annular leg portions are each disposed between, and pressed into contact with, the membrane and the corresponding one of the frame bodies. The membrane is relatively thin and breakable. Therefore, when the surface of the annular leg portion adjacent to the membrane is flat, the membrane can be prevented from being damaged or broken.

(4) In another example of the battery, the annular base portion may have a ridge on each surface thereof facing a corresponding one of the frame bodies.

The annular base portion is disposed between, and pressed into contact with, the frame bodies that are stacked together. Therefore, when the annular base portion has a ridge on the surface thereof adjacent to the corresponding frame body, the ridge is compressed and deformed by the pressure contact. Thus, the resulting surface pressure at the contact with the frame body can provide improved sealing.

(5) In another example of the battery, the membrane may be 1.0 mm or less in thickness.

Even when the membrane is as thin as 1.0 mm or less, the sealing member, which includes the annular base portion and the annular leg portions, can be easily attached to the membrane by simply positioning the annular base portion of the sealing member along the inner periphery of the through hole and sandwiching the membrane between the bifurcated annular leg portions.

(6) In another example of the battery, an inside diameter of the through hole may range from 3 mm to 50 mm.

The through hole with an inside diameter of 3 mm or more can facilitate circulation of the battery fluid, and the through hole with an inside diameter of 50 mm or less can contribute to a reduced increase in the size of the frame bodies. By varying the inside diameter of the annular base portion, the sealing member of the embodiment can be made to fit a desired inside diameter of the through hole. Sealing against the battery fluid can thus be easily ensured.

(7) In another example of the battery, the sealing member may be 3 mm or less in thickness when being sandwiched between the frame bodies stacked together.

The sealing member with a thickness of 3 mm or less can contribute to a reduced increase in the thickness of the battery cell, and thus to a reduced increase in the size of the battery.

(8) In another example of the battery, the battery fluid may be an electrolyte and the battery may be a redox flow battery.

With the sealing member according to the embodiment, it is possible to prevent the electrolyte from leaking between the positive electrode cell and the negative electrode cell through the through hole, and thus to prevent the positive electrode electrolyte and the negative electrode electrolyte from being mixed together. It is also possible to prevent the electrolyte from leaking through the through hole to the outside of the cell stack. Therefore, the battery described above can be suitably used as a redox flow battery.

(9) A sealing member according to another embodiment of the present invention is a sealing member by which a cell member having a through hole that allows a battery fluid to pass therethrough is sealed against the battery fluid. The sealing member includes an annular base portion disposed along an inner periphery of the through hole, and bifurcated annular leg portions extending from the annular base portion toward the outside of the through hole in such a manner that the cell member is sandwiched therebetween.

In the configuration described above, the front and back surfaces of the cell member are sandwiched between the bifurcated annular leg portions and the sealing member is disposed between, and pressed into contact with, its adjacent members and deformed. This can provide sealing between each of the front and back surfaces of the cell member and a corresponding one of the adjacent members. At the same time, the annular base portion can provide sealing against passage from one side (front surface) to the other side (back surface) of the cell member. Since the bifurcated annular leg portions and the annular base portion are formed as an integral member, the sealing at three different points (i.e., sealing between each of the front and back surfaces of the cell member and a corresponding one of the adjacent members and sealing against passage from one side to the other side of the cell member) can be provided by a single sealing member.

As described, the sealing member includes the annular base portion disposed along the inner periphery of the through hole in the cell member, and the bifurcated annular leg portions extending from the annular base portion toward the outside of the through hole. Thus, by simply positioning the annular base portion of the sealing member along the inner periphery of the through hole and sandwiching the cell member between the bifurcated annular leg portions, the sealing member can be easily attached to the cell member. Also, throughout the circumference of the through hole in the cell member, the sealing member is disposed to extend outward from the inner periphery of the through hole. Therefore, the sealing member can be reliably attached to the cell member without being displaced from, or falling off, the cell member.

(10) In an example of the sealing member, in a transverse cross-section of the sealing member under no external force, the annular leg portions may spread out in a V shape from the annular base portion.

When the transverse cross-section of the sealing member is V-shaped, the distance between the extremities of the annular leg portions is greater than the distance between the end portions of the annular leg portions adjacent to the annular base portion. In this case, when the sealing member is attached to the edge of the through hole in the cell member, the edge of the through hole can be easily inserted between the annular leg portions and this facilitates the attaching of the sealing member.

(11) In another example of the sealing member, the annular leg portions may have a ridge on an outer surface thereof opposite a surface thereof facing the cell member.

The annular leg portions are each disposed between, and pressed into contact with, the cell member and a surface facing the cell member. Therefore, when the annular leg portion has a ridge, the ridge is compressed and deformed by the pressure contact. Thus, the resulting surface pressure at the contact with the surface facing the ridge can provide improved sealing.

(12) In another example of the sealing member, an inner surface of each of the annular leg portions, the inner surface facing the cell member, may be flat.

When the surface of the annular leg portion adjacent to the cell member is flat, the cell member can be prevented from being damaged or broken by the annular leg portion.

(13) In another example of the sealing member, the annular base portion may have a ridge on each of front and back surfaces thereof.

The annular base portion is disposed between, and pressed into contact with, the surfaces facing the both side of the annular base portion. Therefore, when the annular base portion has a ridge, the ridge is compressed and deformed by the pressure contact. Thus, the resulting surface pressure at the contact with the surface facing the ridge can provide improved sealing.

(14) In another example of the sealing member, a distance between end portions of the annular leg portions, the end portions being adjacent to the annular base portion, may be 1.0 mm or less.

Even when the distance between the end portions of the annular leg portions adjacent to the annular base portion is as small as 1.0 mm or less, the sealing member, which includes the annular base portion and the annular leg portions, can be easily attached to the cell member by simply positioning the annular base portion of the sealing member along the inner periphery of the through hole and sandwiching the cell member between the bifurcated annular leg portions.

Details of Embodiments of the Present Invention

Details of the embodiments of the present invention will now be described using the drawings. The present invention is not limited to the embodiments described herein and is defined by the claims. All changes that fall within meanings and scopes equivalent to the claims are therefore intended to be embraced by the claims.

First Embodiment

Figure 4:
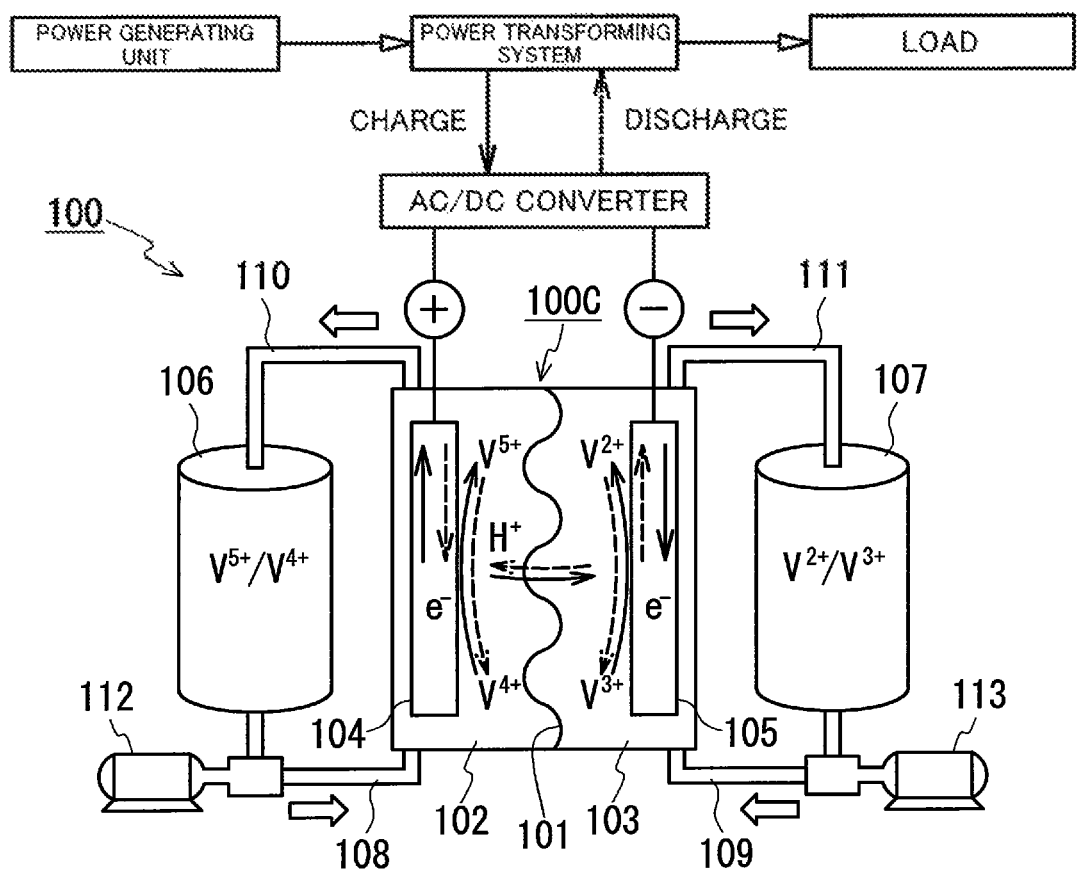
FIG. 4 is a schematic illustration of a redox flow battery.
Figure 5:
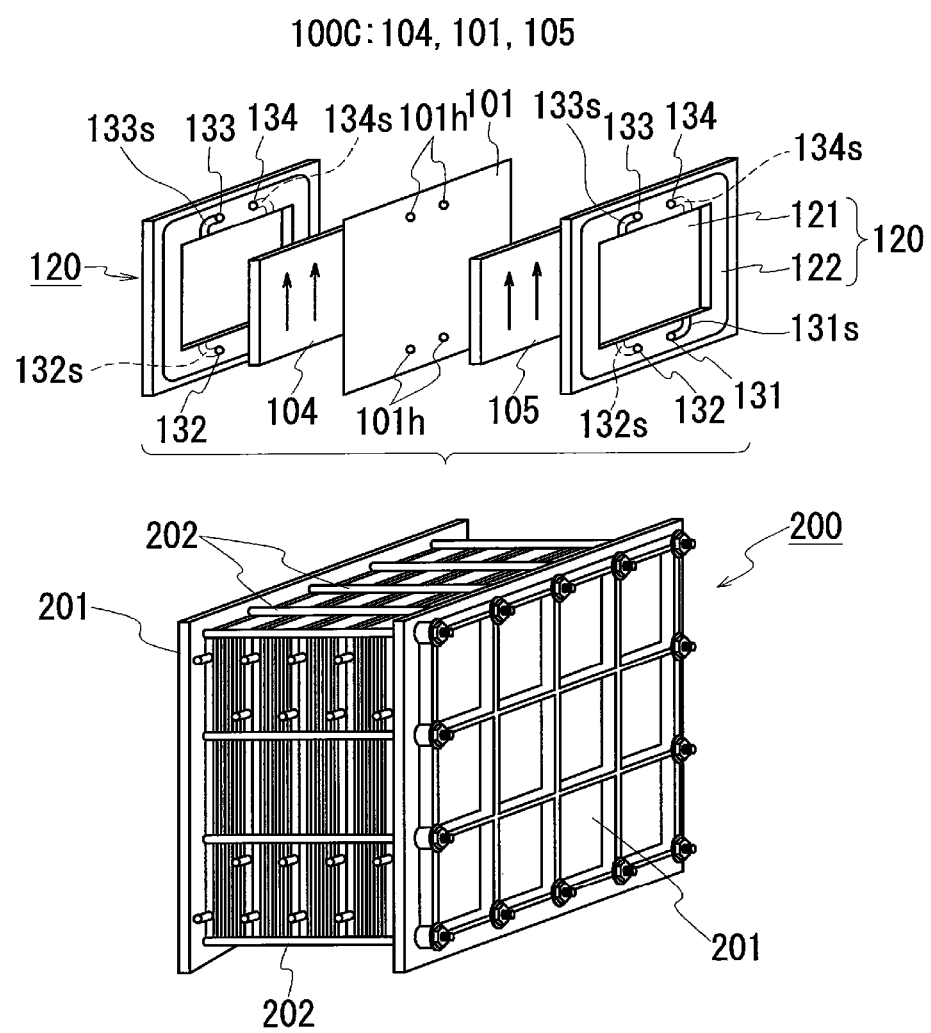
FIG. 5 is a schematic diagram of a cell stack included in the redox flow battery.

In a first embodiment, a redox flow battery (RF battery) will be described as an exemplary fluid flow battery. An RF battery according to the first embodiment is characterized by a sealing structure for a membrane. As other configurations of this RF battery, configurations similar to those of the conventional RF battery 100 described with reference to FIGS. 4 and 5 can be adopted. Therefore, the sealing structure for the membrane will be described with reference to FIGS. 1 to 3, whereas the detailed description of configurations similar to the conventional ones will be omitted by using the same reference numerals as those in FIGS. 4 and 5. A sealing member will be described first, and this will be followed by the description of an RF battery using the sealing member.

(Sealing Member)

Figure 2:
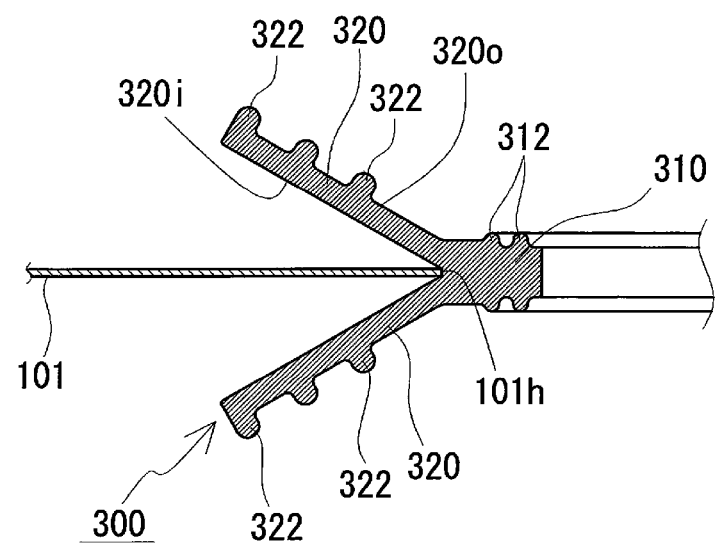
FIG. 2 is a partial enlarged cross-sectional view for explaining a sealing member used in the redox flow battery according to the first embodiment.
Figure 3:
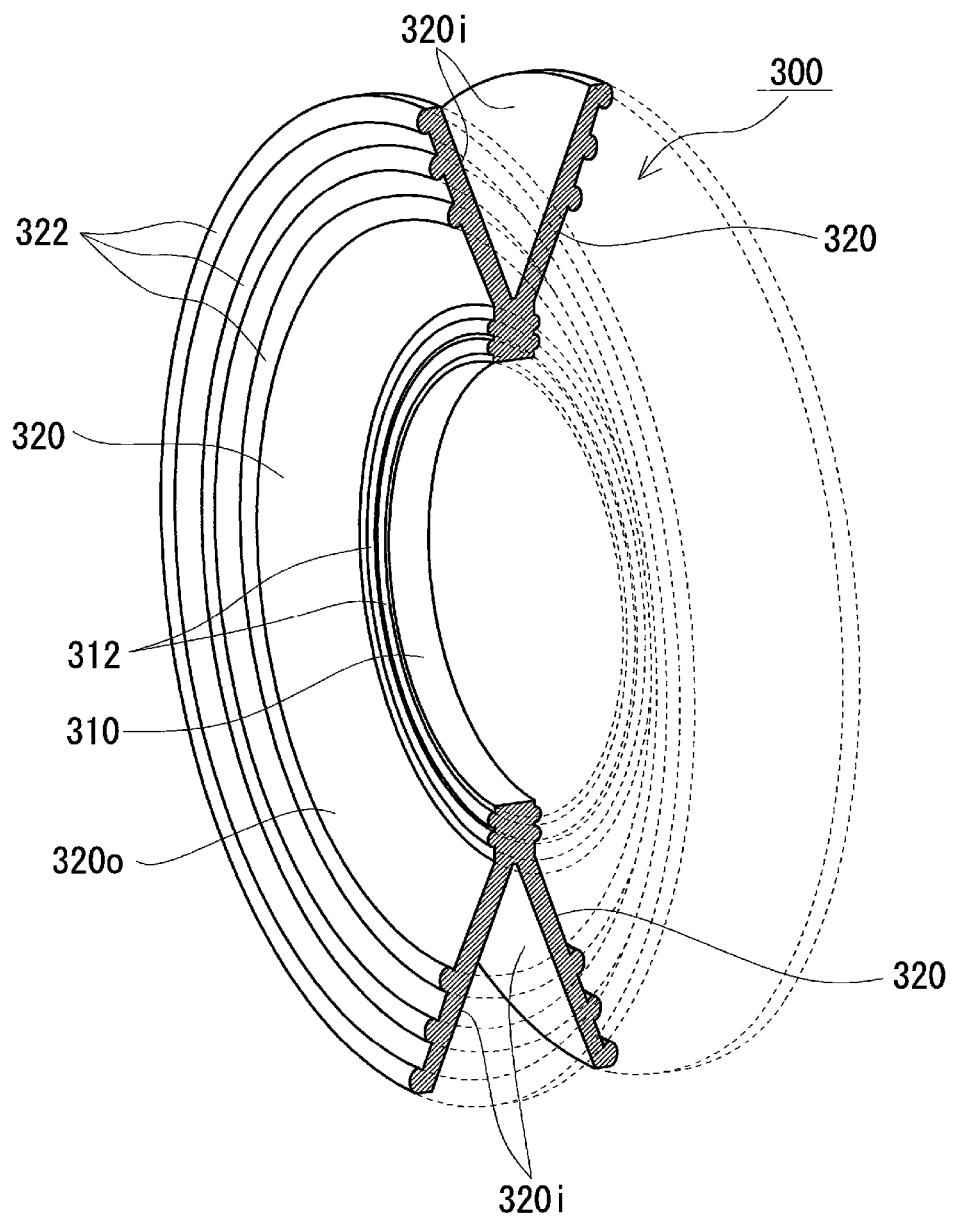
FIG. 3 is a partial cross-sectional perspective view of the sealing member in a non-compressed state, used in the redox flow battery according to the first embodiment.

As illustrated in FIG. 1, a sealing member 300 is a component attached to the inner periphery of a through hole 101*h* in a membrane 101. The sealing member 300 is configured to provide sealing against electrolyte (positive electrode electrolyte or negative electrode electrolyte) passing through the through hole 101*h*. As illustrated in FIGS. 1 to 3, the sealing member 300 includes an annular base portion 310 disposed along the inner periphery of the through hole 101*h* (FIGS. 1 and 2), and bifurcated annular leg portions 320 extending from the annular base portion 310 toward the outside of the through hole 101*h* in such a manner that the membrane 101 is sandwiched therebetween. The annular base portion 310 and the annular leg portions 320 are annularly and integrally formed throughout the circumference thereof.

FIGS. 2 and 3 are diagrams illustrating the sealing member 300 before assembly of a battery cell 100C. As illustrated in FIGS. 2 and 3, under no external force (i.e., in a non-compressed state), the sealing member 300 is substantially V-shaped in a transverse cross-section orthogonal to the circumferential direction. Specifically, in the sealing member 300, the distance between the extremities of the annular leg portions 320 in a pair, extending from the annular base portion 310, is greater than the distance between the end portions of the annular leg portions 320 adjacent to the annular base portion 310. The distance between the end portions of the annular leg portions 320 adjacent to the annular base portion 310 corresponds to the thickness of the membrane 101 and may be 1.0 mm or less, particularly 0.8 mm or less, or more particularly 0.3 mm or less. The distance between the extremities of the annular leg portions 320 in a non-compressed state may be greater than or equal to double, particularly five times, or more particularly seven times the thickness of the membrane 101.

Annular Leg Portion

The annular leg portions 320 are portions between which the membrane 101 is sandwiched. The annular leg portions 320 each have an inner surface 320*i* facing the membrane 101 and an outer surface 320*o* opposite the inner surface 320*i*. The bifurcated annular leg portions 320 are each a sheet-like portion. Any desired dimensions may be selected for the annular leg portions 320 as long as the membrane 101 can be sandwiched between the annular leg portions 320. For example, the length of each of the annular leg portions 320 in a non-compressed state, from the end portion adjacent to the annular base portion 310 to the extremity, may range from 1 mm to 15 mm, particularly from 3 mm to 10 mm, or more particularly from 4 mm to 8 mm. Also, the length between the inner surface 320*i* and the outer surface 320*o* (excluding ridges 322 described below) of each of the annular leg portions 320 in a non-compressed state may range from 2 mm to 20 mm, particularly from 3 mm to 15 mm, or more particularly from 4 mm to 10 mm.

The annular leg portions 320 each have ridges 322 on the outer surface 320*o* thereof. When the battery cell 100C is assembled into a compressed state, the ridges 322 of the annular leg portions 320 are compressed and deformed between the membrane 101 and each frame body 122 (see the lower part of FIG. 1). Thus, the resulting surface pressure on the surface in contact with the frame body 122 can provide improved sealing. When the ridges 322 are provided, the contact surface pressure is determined by the amount of compression (compression ratio) of the ridges 322. The contact surface pressure increases as the amount of compression increases. The height of the ridges 322 may thus range from 0.1 mm to 1 mm, particularly from 0.15 mm to 0.8 mm, or more particularly from 0.2 mm to 0.6 mm.

The ridges 322 are continuously formed along the circumferential direction of the annular leg portions 320 (see FIG. 3). The number of the ridges 322 is not particularly limited and may be appropriately selected. In the present example, the annular leg portions 320 each have three ridges 322. With a plurality of ridges 322, it is possible to increase the number of areas having high contact surface pressure between the annular leg portion 320 and the frame body 122, in the direction from the inner periphery of the through hole 101*h* in the membrane 101 toward the outside of the through hole 101*h*, and this further improves sealing. When the annular leg portions 320 each have the ridges 322, the positions of the ridges 322 of one annular leg portion 320 may either differ from, or coincide with, the positions of the ridges 322 of the other annular leg portion 320. In the present example, the positions of the corresponding ridges 322 of the annular leg portions 320 coincide with each other, and the annular leg portions 320 are symmetric with respect to the annular base portion 310. The ridges 322 may be provided on the outer surface 320o of only one of the annular leg portions 320.

The ridges of the annular leg portions 320 also serve as ribs for reinforcing the annular leg portions 320 (sealing member 300) and have a shape retaining function.

Since the membrane 101 is relatively thin and breakable, it is preferable that the inner surfaces 320i of the annular leg portions 320 facing the membrane 101 be flat. When the annular leg portions 320 have ridges on the inner surfaces 320i, for example, the height and shape of the ridges may be adjusted so as not to damage the membrane 101.

Annular Base Portion

The annular base portion 310 is a portion disposed along the inner periphery of the through hole 101h in the membrane 101. The annular base portion 310 has a front surface facing one of the frame bodies 122 in a pair disposed opposite each other, a back surface facing the other frame body 122, and inner and outer peripheries connecting the front and back surfaces (see FIG. 1).

The annular base portion 310 is substantially rectangular in a transverse cross-section orthogonal to the circumferential direction of the sealing member 300. The outside diameter of the annular base portion 310, that is, the diameter of the outer periphery of the annular base portion in contact with the membrane is substantially equal to the inside diameter of the through hole 101h. The inside diameter of the annular base portion 310, that is, the diameter of the inner periphery of the annular base portion facing the through hole in the membrane may range from 80% to 99% of the inside diameter of the through hole 101h. When the annular base portion 310 has a small inside diameter, that is, when the distance between the inner periphery and the outer periphery of the annular base portion 310 is long, a flow path for circulation of the electrolyte is narrow. When the inside diameter of the annular base portion 310 is greater than or equal to 80% of the inside diameter of the through hole 101h, the flow path for the electrolyte can be secured. When the inside diameter of the annular base portion 310 is less than or equal to 99% of the inside diameter of the through hole 101h, a high level of stiffness of the annular base portion 310 can be easily ensured and this makes it easy to hold together the annular leg portions 320 in a pair.

Any desired dimensions may be selected for the annular base portion 310 as long as the annular leg portions 320 can be disposed along the outer periphery of the annular base portion 310. For example, in a non-compressed state, the distance between the front and back surfaces of the annular base portion 310 may be equal to the sum of the thickness of the membrane 101 and the thicknesses (each being the distance between the inner surface 320i and the outer surface 320o) of the annular leg portions 320.

The annular base portion 310 has ridges 312 on the front and back surfaces thereof each facing a corresponding one of the frame bodies 122. When the battery cell 100C is assembled into a compressed state, the ridges 312 of the annular base portion 310 are compressed and deformed between the frame bodies 122 (see the lower part of FIG. 1). Thus, the resulting surface pressure on the surface in contact with each of the frame bodies 122 can provide improved sealing. When the ridges 312 are provided, the contact surface pressure is determined by the amount of compression (compression ratio) of the ridges 312. The contact surface pressure increases as the amount of compression increases. The height of the ridges 312 may thus range from 0.1 mm to 1 mm, particularly from 0.15 mm to 0.8 mm, or more particularly from 0.2 mm to 0.6 mm.

The ridges 312 are continuously formed along the circumferential direction of the annular base portion 310. The number of the ridges 312 is not particularly limited and may be appropriately selected. In the present example, the annular base portion 310 has two ridges 312 on each of the front and back surfaces thereof. When the front and back surfaces of the annular base portion 310 each have ridges 312 thereon, the positions of the ridges 312 on the front surface may differ from, or coincide with, the positions of the ridges 312 on the back surface. In the present example, the positions of the corresponding ridges 312 on the front and back surfaces of the annular base portion 310 coincide with each other. The ridges 312 may be provided on only one of the front and back surfaces.

The ridges of the annular base portion 310 also serve as ribs for reinforcing the annular base portion 310 (sealing member 300) and have a shape retaining function.

The sealing member 300 is made of an elastic material. When the sealing member 300 is made of an elastic material, even if the battery cell 100C is deformed by expansion or contraction, the sealing member 300 deforms as the frame bodies 122 and the membrane 101 expand and contract, and this makes it possible to ensure sealing. Even if the frame bodies 122 are subjected to stress when the battery cell 100C is deformed by expansion or contraction, the stress is relieved as the sealing member 300 deforms in accordance therewith, and this can prevent the membrane 101 from being damaged or broken. Examples of the elastic material used for the sealing member 300 include rubber materials, such as ethylene propylene diene rubber (EPDM), fluorine rubber, and silicone rubber. In particular, when the sealing member 300 is attached to the membrane 101 of an RF battery 100, it is preferable to use EPDM or fluorine rubber, either of which is highly resistant to electrolytes.

(Basic Components of RF Battery)

Cell Frame

Cell frames 120 each include the frame body 122 with manifolds 130 (including liquid supply manifolds 131 and 132 and liquid discharge manifolds 133 and 134) each serving as a flow path for electrolyte (positive electrode electrolyte or negative electrode electrolyte), and also include a bipolar plate 121 disposed inside the frame body 122, that is, inside the frame body in the planar direction. The bipolar plate 121 can be formed using a conductive material having low electrical resistance, not reacting with electrolytes, and having resistance to electrolytes (e.g., chemical resistance, acid resistance), such as a composite containing a carbon material and an organic material. More specifically, for example, conductive plastic formed into a plate shape may be used as the bipolar plate 121. The conductive plastic contains a conductive inorganic material (e.g., powder or fiber), such as graphite, and an organic material, such as a polyolefin organic compound or a chlorinated organic compound. The frame body 122 is made of, for example, a resin having high electrolyte resistance and electrical insulation properties.

In the present example, the cell frames 120 are each formed by joining a pair of frame pieces, each having a stepped portion, to produce the frame body 122 and then fitting an outer edge of the bipolar plate 121 into a space defined by the stepped portions of the frame pieces (see the upper part of FIG. 1). Thus, by sandwiching the bipolar plate 121 between the frame pieces, a storage space in which the bipolar plate 121 is exposed is created between each of the front and back surfaces of the bipolar plate 121 and the membrane 101. Although an O-ring 500 is provided between the bipolar plate 121 and the frame body 122 in the present example, the frame body may be joined to the outer periphery of the bipolar plate by injection molding, instead of using the O-ring 500.

Positive Electrode and Negative Electrode

A positive electrode 104 and a negative electrode 105 are disposed opposite each other between the bipolar plates 121 of the pair of cell frames 120. Specifically, on a first side of one of the bipolar plates 121, the positive electrode 104 is stored in the storage space formed in the cell frame 120, and on a second side of the other bipolar plate 121, the negative electrode 105 is stored in the storage space formed in the cell frame 120.

Membrane

The membrane 101 is interposed between adjacent frame bodies 122 and between adjacent positive and negative electrodes 104 and 105. The membrane 101 has substantially the same area as the cell frames 120 and is provided with the through holes 101$h$ at portions facing the respective manifolds 130 formed in the frame body 122 of each cell frame 120. The membrane 101 may be, for example, an ion exchange membrane, such as a cation exchange membrane or an anion exchange membrane. The ion exchange membrane is characterized in that (1) it provides effective separation between positive-electrode active material ions and negative-electrode active material ions and that (2) it is highly permeable to H$^+$ ions serving as charge carriers in the battery cell 100C, and thus can be suitably used as the membrane 101. A known membrane can be used as the membrane 101. The thickness of the membrane 101 may be 1.0 mm or less, particularly 0.8 mm or less, or more particularly 0.3 mm or less. The inside diameter of the through hole 101$h$ may range from 3 mm to 50 mm, particularly from 5 mm to 40 mm, or more particularly from 8 mm to 40 mm.

Electrolyte

Electrolytes used in the RF battery 100 contain active material ions, such as metal ions or non-metal ions. For example, vanadium-based electrolytes that contain vanadium ions of different valences (FIG. 4) as positive-electrode active material ions and negative-electrode active material ions may be used. Other examples include iron-chromium-based electrolytes that contain iron (Fe) ions as positive-electrode active material ions and chromium (Cr) ions as negative-electrode active material ions, and manganese-titanium-based electrolytes that contain manganese (Mn) ions as positive-electrode active material ions and titanium (Ti) ions as negative-electrode active material ions. A water solution that contains active materials and at least one acid (selected from sulfuric acid, phosphoric acid, nitric acid, and hydrochloric acid) or acid salt may be used as an electrolyte.

(Attaching of Sealing Member and Assembly of RF Battery)

A method for attaching the sealing member 300 to the through hole 101$h$ in the membrane 101, and a method for assembling the RF battery using the membrane 101 having the sealing member 300 attached thereto will now be described with reference to FIGS. 1 and 2.

First, as in FIG. 2, the annular leg portions 320 of the sealing member 300 are spread out to allow the edge of the through hole 101$h$ in the membrane 101 to be inserted between the annular leg portions 320. In a non-compressed state, the sealing member 300 is substantially V-shaped in a transverse cross-section orthogonal to the circumferential direction of the sealing member 300. Therefore, when the sealing member 300 is attached to the edge of the through hole 101$h$ in the membrane 101, the edge of the membrane 101 can be easily inserted between the annular leg portions 320. The sealing member 300 can thus be easily attached to the edge of the through hole 101$h$ in the membrane 101 (see the upper part of FIG. 1).

Next, as illustrated in the upper part of FIG. 1, the cell frame 120, the positive electrode 104, the membrane 101 having the sealing member 300 attached thereto, the negative electrode 105, the cell frame 120, and so on are sequentially stacked together to form a multilayer body. The sealing member 300 is still in a non-compressed state at this point. Then, end plates 201 are placed at both ends of the multilayer body and coupled together by coupling members 202 to form a cell stack 200 (see FIG. 5).

The cell frames 120 are pressed in directions toward each other (see the lower part of FIG. 1, black arrows in the drawing indicate the pressing directions). Thus, the sealing member 300 is positioned between, and pressed into contact with, the adjacent frame bodies 122 and deformed. When the sealing member 300 is pressed into contact with the frame bodies 122, the annular base portion 310 is brought into close contact with the frame bodies 122 on both sides thereof, and the annular leg portions 320 are brought into close contact with the front and back surfaces of the membrane 101 and the pair of frame bodies 122. This produces a sealing structure that provides sealing against the electrolyte passing through the through hole 101$h$ in the membrane 101 (see the lower part of FIG. 1). As described, the annular base portion 310 and the annular leg portions 320 have corresponding ones of the ridges 312 and 322. Therefore, when the sealing member 300 is pressed into contact with the frame bodies 122, the ridges 312 and 322 are each compressed in the pressure contact direction and this provides improved sealing. When pressed into contact with and sandwiched between the frame bodies 122 (i.e., in a compressed state), the sealing member 300 may have a thickness of 3 mm or less, particularly 2.5 mm or less, or more particularly 2 mm or less.

(Advantages)

The sealing member 300 according to the first embodiment is configured in such a manner that the inner periphery of the through hole 101$h$ in the membrane 101 is sandwiched between the bifurcated annular leg portions 320 on the front and back sides. Thus, when the sealing member 300 is pressed into contact with the frame bodies 122 and deformed, it is possible to provide sealing between each of the front and back surfaces of the membrane 101 and a corresponding one of the frame bodies 122. Also, the annular base portion 310 can provide sealing against passage from one side (front surface) of the membrane 101 through the through hole 101$h$ to the other side (back surface) of the membrane 101.

Since the bifurcated annular leg portions 320 and the annular base portion 310 are formed as an integral member, the sealing at different points described above can be provided by a single sealing member 300. This facilitates assembly. Throughout the circumference of the through hole 101$h$ in the membrane 101, the sealing member 300 is disposed to extend outward from the inner periphery of the through hole 101$h$. Therefore, as compared to the case of placing an O-ring on each of the front and back surfaces of the membrane 101, the bifurcated annular leg portions 320 are less likely to be displaced from each other and the membrane 101 is less likely to be broken or damaged.

In particular, when the sealing member 300 is substantially V-shaped in a transverse cross-section orthogonal to the circumferential direction thereof, the edge of the membrane 101 can be easily inserted between the annular leg portions 320 when the sealing member 300 is attached to the edge of the through hole 101*h* in the membrane 101. The attaching of the sealing member 300 is thus facilitated. Additionally, throughout the circumference of the through hole 101*h* in the membrane 101, the sealing member 300 is disposed to extend outward from the inner periphery of the through hole 101*h*. Therefore, the sealing member 300 can be reliably attached to the membrane 101 without being displaced from, or falling off, the membrane 101. With the sealing member 300 described above, a sealing structure that provides sealing against electrolyte passing through the through hole 101*h* in the membrane 101 can be produced without depending on operator skills, and easy assembly is achieved.

The RF battery according to the first embodiment includes the membrane 101 having the sealing member 300 attached thereto. This makes it possible to prevent the electrolyte from leaking between the positive electrode cell 102 and the negative electrode cell 103 through the through hole 101*h* in the membrane 101 and also to prevent the electrolyte from leaking through the through hole 101*h* to the outside of the cell stack 200. Since sealing against the electrolyte flowing through the through hole 101*h* in the membrane 101 is ensured, the RF battery can operate stably even when installed in an environment where, for example, operating conditions change rapidly.

INDUSTRIAL APPLICABILITY

The battery according to the present invention can be suitably used as a fluid flow battery, such as a redox flow battery or fuel cell. For power generation by natural energy, such as solar or wind energy, the battery according to the present invention can be suitably used as a storage battery which is intended, for example, to stabilize the output of power generation, store electricity when there is a surplus of generated power, and provide load leveling. The battery according to the present invention may be installed in a general power plant and used as a storage battery which is intended to provide a measure against instantaneous voltage drops or power failures and to provide load leveling. The battery according to the present invention can be suitably used particularly as a large-capacity storage battery designed for the purposes described above. The sealing member according to the present invention can be suitably used as a sealing structure for a fluid flow battery, such as a redox flow battery or fuel cell.

REFERENCE SIGNS LIST

100: redox flow battery (RF battery)
100C: battery cell
   101: membrane, 101*h*: through hole
102: positive electrode cell, 103: negative electrode cell
104: positive electrode, 105: negative electrode
106: positive electrode electrolyte tank, 107: negative electrode electrolyte tank
108 to 111: pipe, 112, 113: pump
200: cell stack
201: end plate, 202: coupling member
120: cell frame, 121: bipolar plate, 122: frame body
130: manifold
131, 132: liquid supply manifold, 133, 134: liquid discharge manifold
131*s*, 132*s*: liquid supply slit, 133*s*, 134*s*: liquid discharge slit
300: sealing member
   310: annular base portion, 312: ridge
   320: annular leg portion, 320*i*: inner surface, 320*o*: outer surface
   322: ridge
500: O-ring

The invention claimed is:

1. A battery comprising:
at least one pair of cell frames stacked together and each including a frame body and a bipolar plate, the frame body having a manifold serving as a flow path for a battery fluid, the bipolar plate being disposed inside the frame body;
a positive electrode and a negative electrode disposed opposite each other between the bipolar plates of the pair of cell frames; and
a membrane interposed between the frame bodies stacked together and between the positive electrode and the negative electrode, the membrane having a through hole corresponding to the manifold,
wherein the battery includes a sealing member including an annular base portion and bifurcated annular leg portions, the annular base portion being disposed along an inner periphery of the through hole, the bifurcated annular leg portions extending from the annular base portion toward an outside of the through hole in such a manner that the membrane is sandwiched therebetween, the sealing member being interposed between the frame bodies stacked together.

2. The battery according to claim 1, wherein the sealing member is 3 mm or less in thickness when being sandwiched between the frame bodies stacked together.

3. The battery according to claim 1, wherein the annular leg portions each have a ridge on a surface thereof facing a corresponding one of the frame bodies.

4. The battery according to claim 1, wherein a surface of each of the annular leg portions, the surface facing the membrane, is flat.

5. The battery according to claim 1, wherein the annular base portion has a ridge on a surface thereof facing a corresponding one of the frame bodies.

6. The battery according to claim 1, wherein an inside diameter of the annular base portion is less than a diameter of extended ends of the bifurcated annular leg portions extending from the annular base portion.

7. The battery according to claim 1, wherein the membrane is 1.0 mm or less in thickness.

8. The battery according to claim 1, wherein an inside diameter of the through hole ranges from 3 mm to 50 mm.

9. The battery according to claim 1, wherein the battery fluid is an electrolyte and the battery is a redox flow battery.

\* \* \* \* \*